United States Patent [19]
Ambrosio

[11] 3,932,730
[45] Jan. 13, 1976

[54] POINT-OF-ACTION BILLING TRANSACTOR

[75] Inventor: Biagio F. Ambrosio, Woodland Hills, Calif.

[73] Assignee: Electronic Memories & Magnetics Corporation, Los Angeles, Calif.

[22] Filed: Sept. 30, 1974

[21] Appl. No.: 510,560

Related U.S. Application Data

[63] Continuation of Ser. No. 356,503, May 2, 1973, abandoned.

[52] U.S. Cl. .......................................... 235/61.9 R
[51] Int. Cl.² ........................................ G06K 1/00
[58] Field of Search ................ 235/61.6, 61.8, 61.9; 340/172.5, 149, 149 A, 150, 151

[56] References Cited
UNITED STATES PATENTS

| | | | |
|---|---|---|---|
| 3,441,714 | 4/1969 | Simjian | 235/61.6 |
| 3,495,222 | 2/1970 | Perotto et al. | 340/172.5 |
| 3,505,646 | 4/1970 | Affel, Jr. et al. | 340/172.5 |
| 3,548,161 | 12/1970 | Schwarz | 235/61.6 |
| 3,590,220 | 6/1971 | Ishida et al. | 235/61.9 |
| 3,748,452 | 7/1973 | Ruben | 235/168 |
| 3,770,941 | 11/1973 | Gechele et al. | 235/61.7 R |

*Primary Examiner*—Daryl W. Cook
*Attorney, Agent, or Firm*—Lindenberg, Freilich, Wasserman, Rosen & Fernandez

[57] ABSTRACT

A utility billing transactor is disclosed for entering a new meter reading, computing the amount of utility service delivered as the difference between a previous meter reading and the new meter reading, computing the amount to be paid, and printing a bill showing the new meter reading and the amount due. A card, which has the customer's identification (ID) number, previous meter reading and billing rate code entered on it, is inserted into the transactor to initiate automatic sequencing of steps to: read the ID number, call for keyboard entry of a new meter reading, read the previous meter reading, compute the difference between the meter reading, compute the amount due as the product of a rate or schedule of rates determined from the billing rate code (either directly or through a table stored in a read-only memory) and printing the bill. The entire transaction, including data read from the card and data computed is recorded in nonvolatile memory and immediately checked for recording error.

5 Claims, 11 Drawing Figures

POINT-OF-ACTION BILLING TRANSACTOR

This application is a continuation of application Ser. No. 356,503, filed May 2, 1973, now abandoned.

BACKGROUND OF THE INVENTION

This invention relates to apparatus which accepts a record medium prepared with necessary data for billing a utility customer upon reading and entering through a keyboard a new meter reading.

Past efforts to provide a utility-meter reader with portable apparatus for entering a new meter reading and calculating the amount due since the previous meter reading have not been adopted for use by utility companies because of the limited time the meter reader has to cover his route. It would obviously take too much time for the meter reader to plug his portable apparatus into the meter for automatic reading. Consequently, the past efforts have been directed to apparatus into which the meter reader merely keys in the new meter reading, such as shown in U.S. Patent No. 3,590,220. However, that apparatus requires many manual operations to control the sequence of operations, thus burdening the meter reader to the point where he may require more time to complete his route. What is required is a fully automatic billing transactor which responds to the insertion of a previously prepared record medium, such as a billing card, to control the necessary sequence of operations, including the manual entry of a new meter reading, for the amount due to be calculated and for the transaction to be recorded on the record medium for immediate delivery to the customer as a "utility bill."

SUMMARY OF THE INVENTION

The invention is characterized by apparatus having means for accepting a record medium on which there is prerecorded a customers identification number, previous meter reading and a code indicating the rate to be charged the customer for the utility service consumed. The apparatus includes means for reading the data recorded on the record medium. Means for entering the new meter reading through keyboard, means for calculating the difference between the new meter reading and the previous meter reading, means for computing the amount due based upon the difference computed as a function of the applicable rate indicated by the billing rate code, either directly or through addressing a random access memory in which a rate schedule is stored, and printing on the record medium at least the new meter reading and the amount due, all automatically, except for entry of the new meter reading which is automatically called for in proper sequence but is manually entered before the sequence of operations resumes. Sequence control means in the form of prewired logic elements, including a sequence counter, responds to clock pulses once a record medium is inserted into the accepting means to control in sequence the operation of the foregoing means. When entry of the new meter reading is required as the next step, inhibiting means included in the sequence control means inhibits clock pulses from being applied to the sequence control counter until the new meter reading has been entered. The sequence control means also controls printing of at least the new meter reading and the amount due at appropriate times. The computed difference and amount due is printed automatically after the amount due has been computed.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
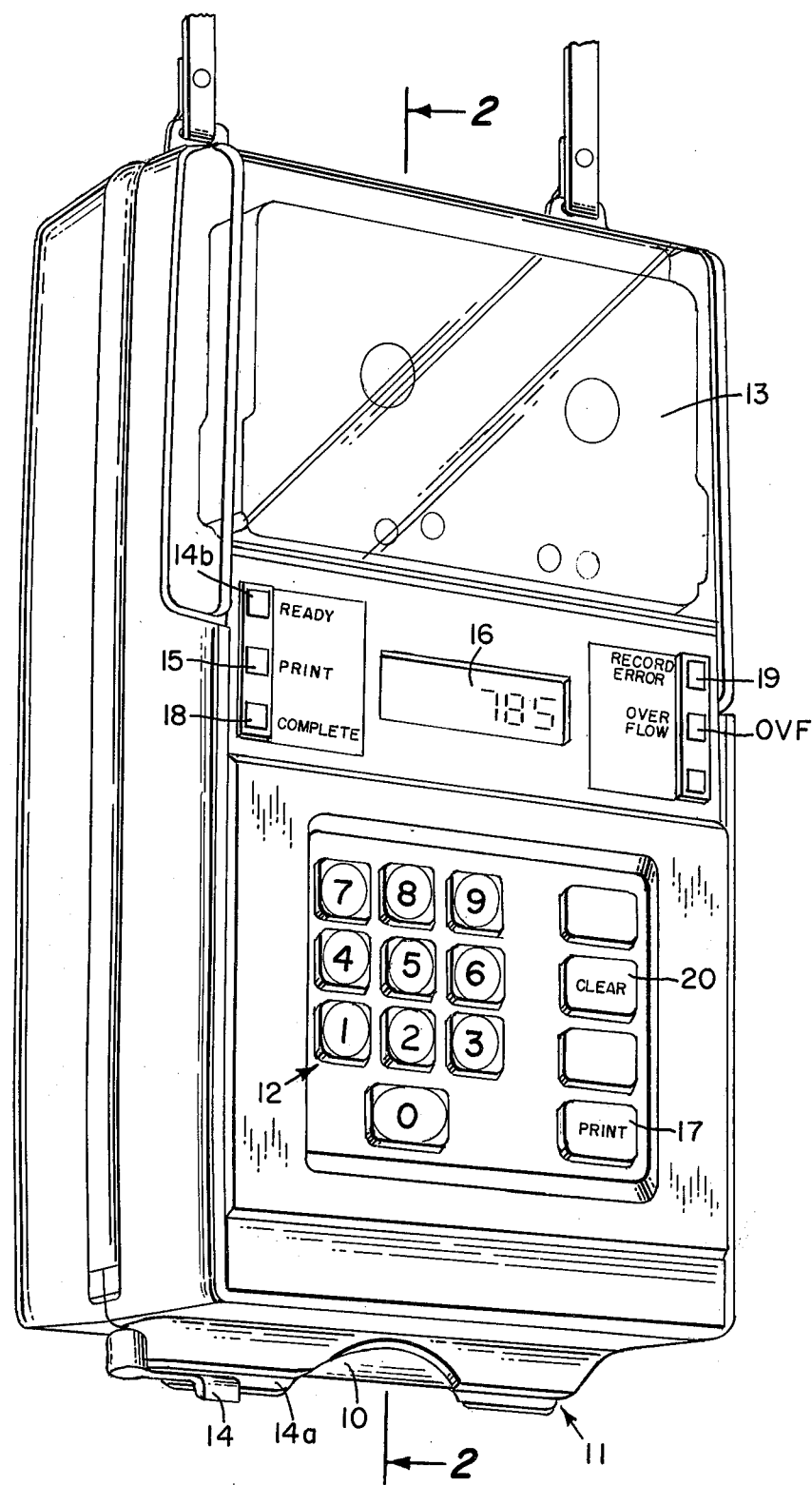
FIG. 1 is a perspective view of an exemplary embodiment of the invention.

FIG. 1 shows in perspective an illustrative transactor adapted to receive a billing card 10 of a particular utility customer in a slot 11. The card is prepared in advance for the purpose of reading the utility meter and preparing a bill. The necessary information unique to the transaction and required for the new bill is read from the card. The new meter reading is entered through a keyboard 12. The keyboard includes pushbutton keys numbered 0 through 9 for entering the new transaction with the most significant digit first and a fixed decimal point. As in conventional desk calculators, leading zeroes neeed not be entered because the digits entered in sequence are shifted serially through the least significant digit position into more significant digit positions. The keyboard includes additional pushbutton keys to provide what little operator control is required by the transactor over the data processing for the particular transaction.

For simplicity in describing this first exemplary embodiment, all numbers entered into the tape buffer and the calculator are limited to five decimal digits. However, through the technology of integrated circuits, it would be feasible to provide as many as eight or ten decimal digits, and internal registers are provided with sufficient digit capacity to provide the precision desired in the calculations.

Pertinent data involved in the transaction is stored in a nonvolatile bulk store memory 13 for later use by a central office in updating the customer's account, including the total amount to be paid. Some of the data read from the card by the transactor is preprinted on the card in a form suitable for the customer to read. Transaction data not read from the card by the transactor, but entered through the keyboard and developed by the transactor, is stored in the bulk store memory and is printed on the card. The billing card is then ready for immediate delivery to the customer.

It is contemplated that the transactor will be repeatedly used for the same type of transaction, namely gas, water or electricity billing, in order that all of the data processing may be preprogrammed in such a manner that the required sequence, or sequences, will be prewired in a sequence control section. The operator need only insert the card and secure it in place by pivoting a latch 14 over the slot 11 to hold the card in place. When a READY light 14b comes on, the operator merely enters the new meter reading as transaction datum. When the datum has been entered, a print light 15 comes on and a display window 16 shows the datum entered. Once satisfied that the datum has been correctly entered, the operator depresses a PRINT button 17, and the transactor will accept the entered datum for automatic processing. When the processing is complete, a light 18 comes on. That light remains on until a CLEAR button 20 is depressed to clear the transactor, or until the billing card is removed, at which time the transactor is automatically cleared. The operator pivots the latch 14 forward away from a back stop 14a to allow the card 10 to be removed. That removes power from the system, except where necessary, such as in a dynamic store memory for preprogrammed sequences and/or data tables, if any, by releasing a spring loaded microswitch depressed by the pivotal latch 14 when its position against the stop 14a.

Data transferred to the bulk store memory 13 is checked. If an error occurs in the process of storing the data, the data is automatically restored until free of error, or until storing has been attempted a specified number of times. If successful storing has not been completed by then, a record-error light 19 comes on. The operator will then remove the card as usual and mark it "error" for the central office to check or compute from the new meter printed on the card. If not correctly printed, the new meter reading can be written on the card in pencil.

Figure 2:
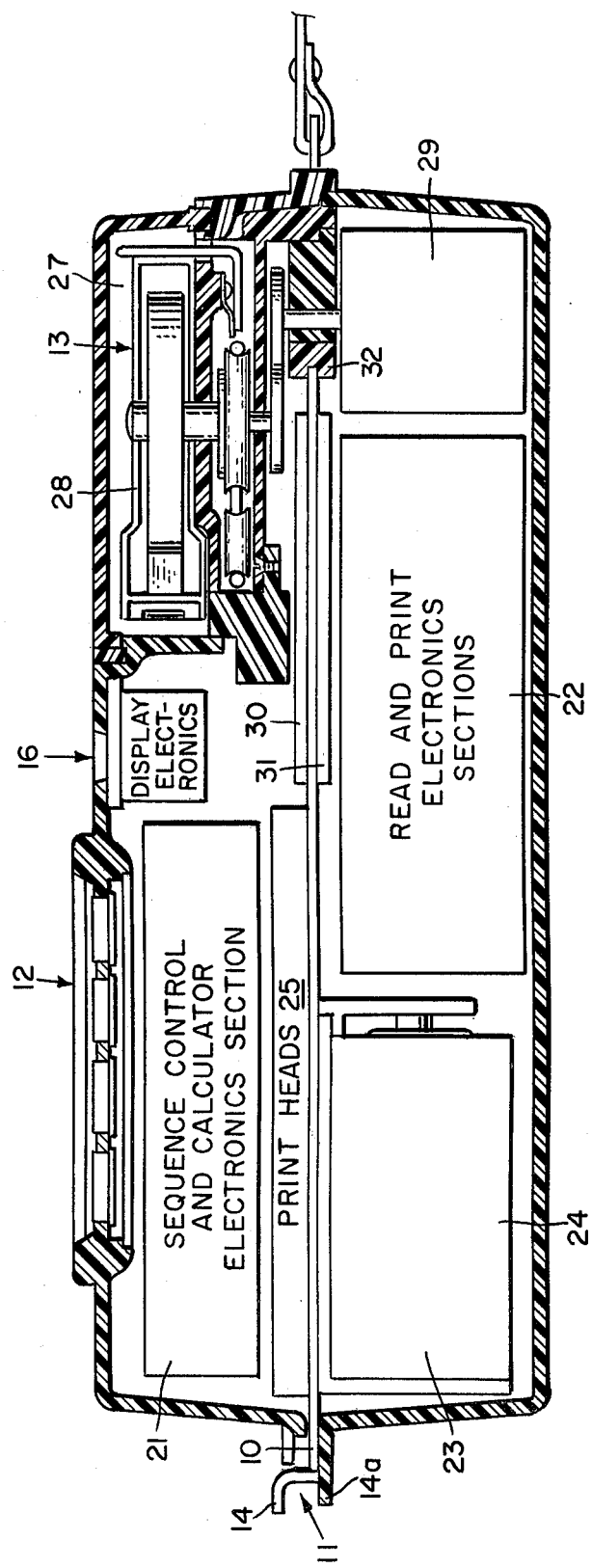
FIG. 2 is a sectional view taken along the line 2—2 of FIG. 1

From the foregoing it is evident that the billing transactor shown in FIG. 1 is comprised of five major sections: a keyboard and read section, a sequence control section, a calculator section, a print section and a bulk store memory section. FIG. 2 illustrates in a cross section along a line 2—2 of FIG. 1 the general layout of these sections. The sequence control and calculator electronics sections are housed in a compartment 21. The read and print sections are housed in a compartment 22. Batteries 23 are housed in a compartment 24. Print heads are housed in a narrow compartment 25 on one side of the card 10 inserted through the slot 11. As will be described more fully hereinafter, each print head is comprised of five 7-bar-segment printing sections capable of numeric line printing of five decimal digits on electrosensitive paper. The bulk store memory is housed in a compartment 27. It is comprised of a magnetic tape cassette 28 driven by a motor 29.

The data to be read from the card is stored in the form of punched holes in columns. To sense the punched holes, elongated light emitting phosphorous films are disposed in a thin compartment 30 over the columns to be read, and photocells are disposed under the card in a thin compartment 31, one photocell under each hole position of each column of holes. Slotted guides extending along the sides of the card hold the card in proper position for reading. The latch 14 holds the card secure against a slotted bar 32 extending between the inner ends of the two slotted side guides.

For convenience, electric meter reading and billing will be used by way of example, and not by way of limitation. The billing card shown in FIG. 3 consists of a first portion 31 separated from a second portion 32 by a perforated line 33. The name and address of the utility company is printed on the second portion to be returned with payment, and only the name of the company is printed on the first portion to be retained by the customer for his records. A space 34 is provided for the transactor to enter the amount to be paid in the second portion as well as a space 35 in the first portion. Spaces 36 and 37 are provided for printing the new meter reading entered into the calculator and the consumption (difference between the new meter reading and the previous meter reading) computed by the transactor.

The card is not only a record medium for the bill, it is also a "page" out of the meter reader's route book. On the first portion of each card there is printed essential information from the route book pertaining to the customer, such as the customer's name and address, the customer's account number, the service period, and a billing code or factor, K. The card may also have imprinted thereon by the central office of the utility company a meter identification number, a code indicating the meter location, and the previous meter reading. With this information, the meter reader can carry out his normal function and using the transactor, prepare the bill for immediate delivery at the customer's address.

The first portion of the card has three fields of punched columns: a meter identification field, ID; a previous meter reading field, PMR; and a billing factor or code field, K. These fields are prepunched at the central office. For simplicity in illustrating a specific embodiment of the invention, it is assumed that each field consists of five decimal digits, and that each decimal digit of a value from 0 through 9 is indicated by a punched hole in a corresponding one of ten rows conventionally designated 0 through 9. In practice, a conventional Hollerith card has 80 columns and 12 rows. The top two rows, usually designated 11 and 12, are not used in the first exemplary embodiment to be described, but may be used in other embodiments to provide sequence control over the automatic operation of the transactor.

The account number on the second portion is used at the central office to post the payment. The number can be read optically for sorting. The amount to be paid may also be optically read for posting. If an incorrect amount is received, an opaque overlay can be printed with the amount received. Alternatively, the account number may be prepunched in the second portion for sorting in a field to the left of the space 34. The amount received would then be punched in the remaining columns for automatic posting. In either case, the upper left corner of the returned portion may be precut as a means of checking the proper orientation of that portion in the sorting and posting apparatus.

The upper left corner of the first portion is precut to provide a means of checking proper orientation of the billing card when inserted in the transactor of FIGS. 1 and 2. For example, a microswitch may be mounted near the bar 32 at the one corner of the card space not intended to receive the cut corner of the card. Inserting the card properly will then close the microswitch and apply power to the transactor. If the cut corner is inadvertently inserted into that corner of the card space, the microswitch will not be closed, thereby forcing the operator to reverse the card in order to proceed. That microswitch is connected in series with the first microswitch referred to hereinbefore, mounted in such a position that it will be closed by the latch 14 only when the latch is in proper latching position against the stop 14a. Thus, the card must not only be inserted properly but also latched in position in order for the power to be applied to the transactor. Removing a processed billing card automatically removes power to conserve the limited power of the batteries.

As will be described more fully hereinafter, the meter reader selects the correct card for a customer and inserts it into the billing transactor. That automatically starts the programmed sequence of the transactor, and preliminary steps are carried out until the new meter reading, NMR, is required. The sequence is then stopped and the READY light is turned on until the meter reader has entered the new meter reading through the keyboard into a keyboard buffer register from which it is displayed in the window 6 using 7-bar segment light emitting diodes for each digit position. The PRINT light then comes on. When the PRINT button is depressed, the new meter reading is stored in a tape-buffer register. It is nondestructively read out from there and printed. It is also entered from there into the calculator section of the transactor.

As will be more apparent from the following description of an exemplary embodiment, all data read from the card is stored in the tape buffer but not all data is printed or is used in the calculator, such as the customer ID number. Data that is to be printed is read from the tape buffer for printing, and data that is to be used in the calculator is transferred to calculator registers.

Once the new meter reading has been entered in the calculator, the previous meter reading, PMR, and the billing rate, K, are read and stored in the tape buffer. Both are entered into the calculator from the tape buffer, and the previous meter reading is printed. Once the consumption (Δ=NMR-PMR) has been calculated, it is also stored in the tape buffer and printed. The amount to be paid is thereafter computed, stored in the tape buffer and printed. For simplicity, in the first embodiment to be described, a constant billing rate or factor is assumed for each customer, although the rate may be different for different classes of customers. It is also assumed that the billing factor includes any applicable tax rate. The amount to be paid is then simply the product of consumption times the billing factor. If the billing factor is not a constant, but decreases in steps as consumption increases, the factor K may be a code used to address a read-only memory (ROM) for the applicable rate schedule. The predetermined program for sequencing operations of the calculator would then be expanded accordingly, as will be described for a second embodiment of the invention.

The limit as to what can be included in the bill is only the number of columns on the card, and the extent of transactor memory. In the first embodiment, nothing is to be added to the basic bill so that transactor memory is not required; only the bulk storage unit is provided to store each transaction. If there is a balance due from a previous bill, it can be preprinted on the billing card with instructions to the customer to add that to the amount to be paid for the current billing period.

Figure 4:
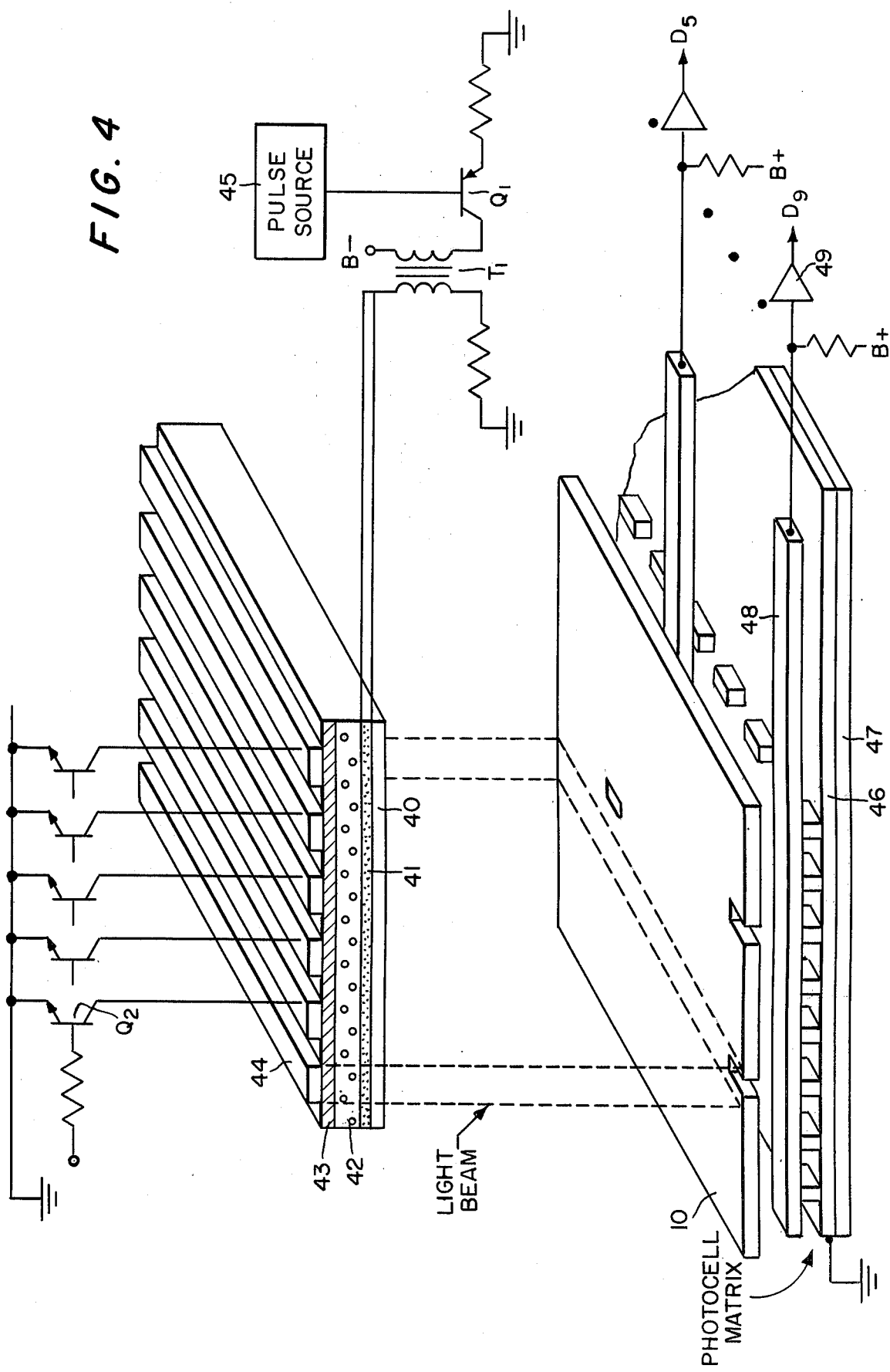
FIG. 4 illustrates in an exploded isometric view an arrangement for a punched card reader in the exemplary embodiment.

Once the billing card 10 has been inserted in the slot 11 and the latch 14 is in position to secure the card in place, power is applied to the system, as noted hereinbefore. The first step is to begin reading the card. FIG. 4 illustrates in more detail the card read sections 30 and 31, referred to with reference to FIG. 2. In the light emitting section 30, a thin glass plate 40 is coated with a transparent electrode 41 in a uniform sheet. A film 42 of light emitting phosphor vacuum deposited over the transparent electrode is then coated with a dark dielectric film 43. Metallic electrodes 44 are deposited on the dielectric film in elongated sections over the column positions of cards to be read.

A source of pulses 45, such as a relaxation oscillator, energizes the light emitting film with high negative voltage through a PNP transistor $Q_1$ and a step-up transformer $T_1$. However, electrons are injected into the light emitting film only when an elongated electrode 44 is selectively connected to circuit ground, such as by a switch comprised of a transistor $Q_2$. The phosphor then emits light along the entire length of the selected electrode. That light passes through a hole in the card column positioned below the elongated electrode. A discrete photocell in a matrix detects the light emitted by phosphor.

In the photocell matrix, there is one photocell for each hole position of each column. Therefore, to read 15 columns of 10 rows, there are 150 photocells arrayed in rows and columns. Each photocell is connected between a metallic sheet 46 deposited on an insulating substrate 47 and a separate transparent electrode 48 running across photocells along each row. In that manner, selectively energizing one column electrode 44 illuminates a column of hole positions 0 through 9. Only one hole is punched in a column. Consequently, only one row electrode 48 will conduct, thus indicating the decimal digit stored in the card column illuminated according to the position of the conducting electrode in the array. An amplifier 49 inverts and amplifies the pulse produced.

Figure 5:
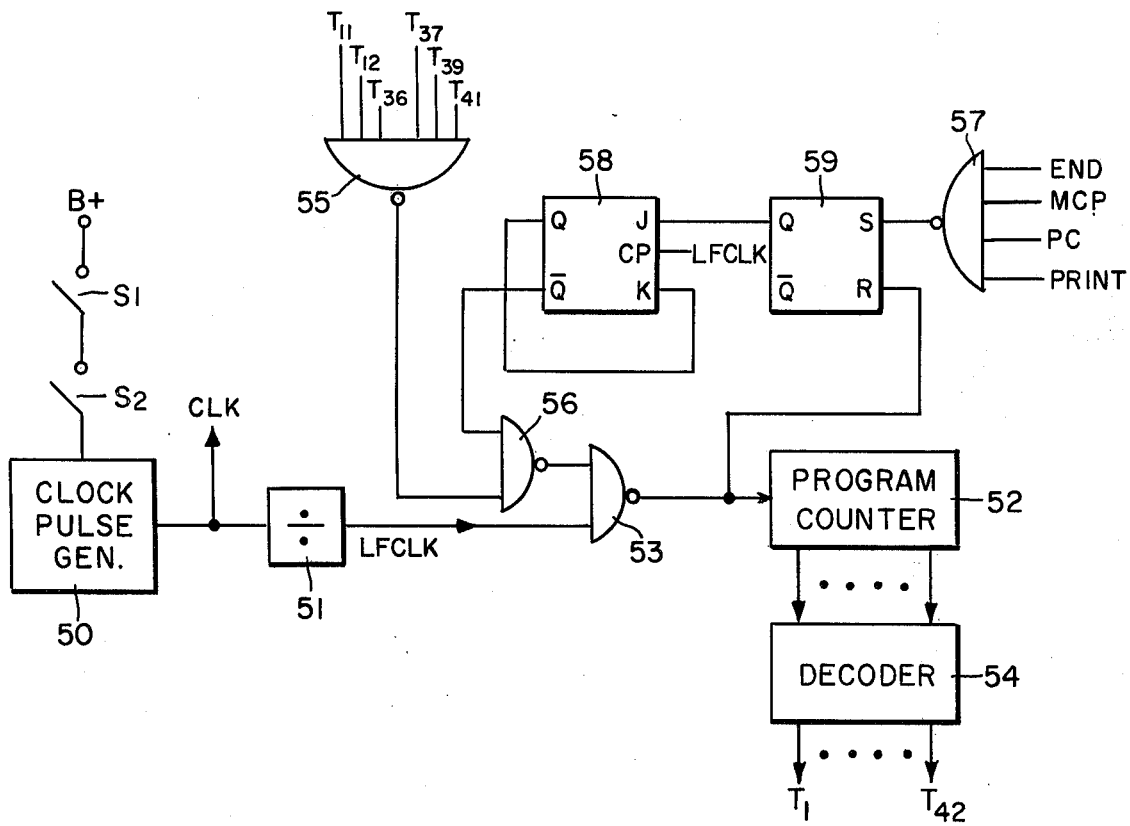
FIG. 5 is a logic diagram of a sequence control unit for the exemplary embodiment.

Referring now to FIG. 5, a clock pulse generator 50 is turned on when microswitches $S_1$ and $S_2$ are closed by the proper insertion of a billing card and a proper positioning of the card latching lever 14, as described hereinbefore. The pulse generator may in practice be the same self starting relaxation oscillator used for the card reader as just described. A multivibrator, or other pulse shaping circuit, at the output of the generator provides the proper shape and amplitude for the clock pulses. The nominal frequency of the clock pulses (CLK) thus produced is 250 KHz for use in the system to be discussed with reference to FIG. 6.

A frequency divider 51 reduces the system clock to a lower frequency clock (LFCLK) such as 250 Hz, for use in driving a program counter 52 through a NAND gate 53. A decoder 54 decodes the binary output of the counter and provides timing signals $T_1$, $T_2$, $T_3$ ... $T_{42}$ used in controlling the sequence of operations in the system of FIG. 6. When more than one period of the pulse train derived from the frequency divider 51 is required for the operation called for by a timing signal $T_n$, the complement $T_n'$ of the timing signal disables the counter through NAND gates 55 and 56. The second input terminal of the gate 56 is true (1) until it is time to release the hold on the counter 52.

Once the operation is complete, a signal indicating completion, or otherwise indicating that the program sequence should be advanced to the next step, releases the "hold" imposed on the pulses to the counter through a NAND gate 57 and flip-flops 58 and 59. That is done by setting the flip-flop 58 which enables the next LFCLK pulse to set the flip-flop 59. The first LFCLK then gated out to the counter 52 then resets the flip-flop 58. The gates 55 and 57 function as OR gates while gate 53 functions as an AND gate. The gate 56 then provides the inhibit function. The flip-flop 58 responds at its set and reset input terminals to a positive going step voltage. Consequently, all inputs to the gate 57 are normally positive (1) to hold the output at a negative (0) level. When a releasing signal drops one input terminal to a negative (0) level, it produces a rise at the output terminal of the gate to a positive, thus producing a positive going step voltage. Once released, the counter will receive clock pulses and advance the program sequence through successive steps until again disabled via gate 55.

The system organization of a card reader, tape store, keyboard entry and display, calculator and card printer will now be described with reference to FIG. 6. A card reader 60 implemented as described with reference to FIG. 4, is energized when the switches $S_1$ and $S_2$ are closed, as is the rest of the system, but no column is illuminated until time $T_2$. At time $T_1$, all system registers and flip-flops are reset (cleared) except in the sequence control section of FIG. 5. Then at time $T_2$, transistor $Q_2$ (FIG. 4) is turned on to illuminate column 1 of the card, thus initiating a sequence for reading out a five-digit meter code, $D_5D_4D_3D_2D_1$, from columns 1–5. A converter 61 converts each decimal digit signal to a 4-bit code, $B_1$–$B_4$.

Figure 9:
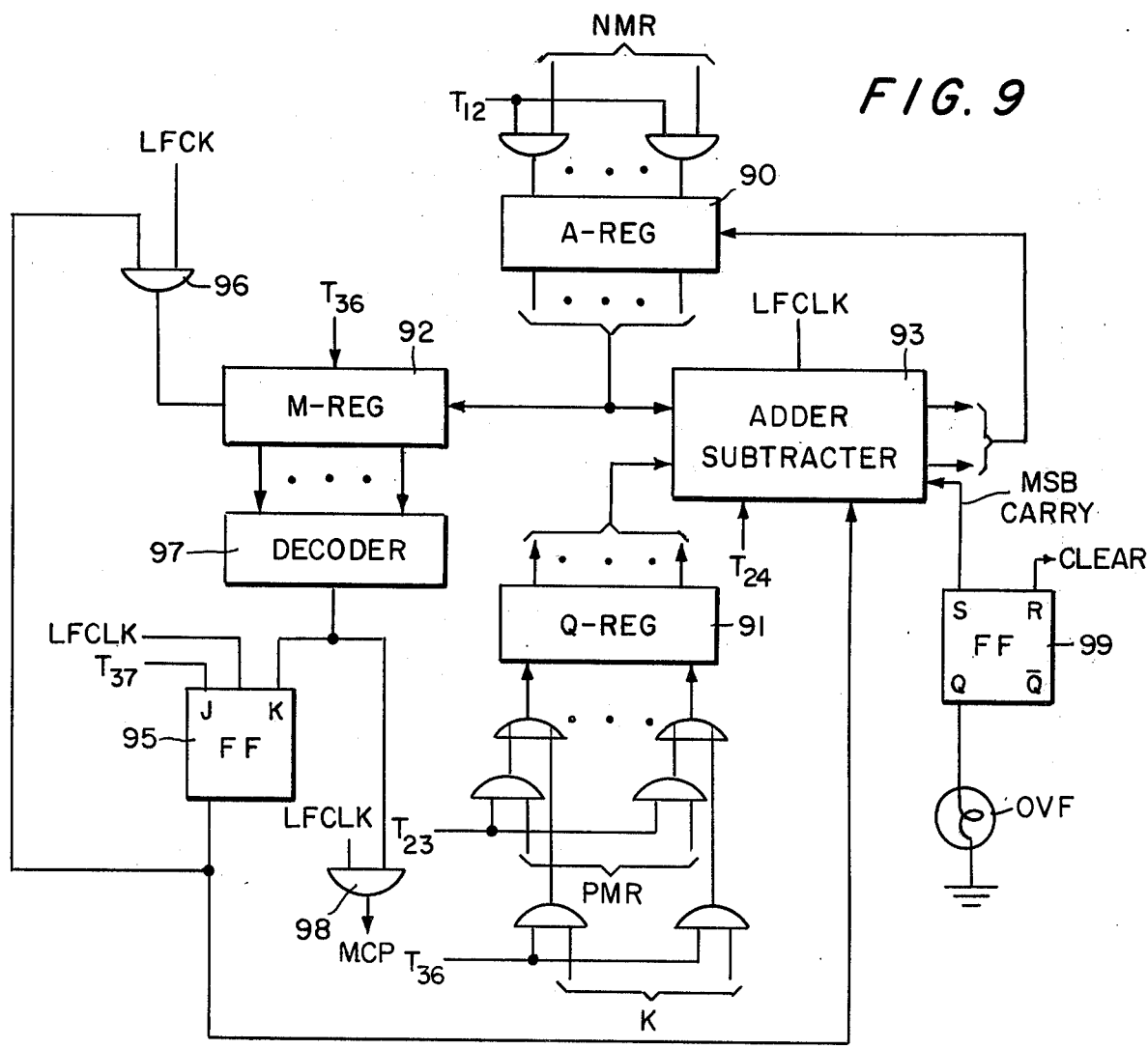
FIG. 9 is a logic diagram of a calculator in the system of FIG. 6.

At time $T_3$, the most significant digit (MSD) $D_5$ of the meter ID code read from column 1 is stored in parallel in the MSD position of a thirty-digit (120-bit) register of a tape buffer register 62. The next four digits of the meter code are then read in sequence and stored. The sequence is as follows:

$T_2$ - energize Column 1
$T_3$ - store $D_5$
$T_4$ - energize Column 2
$T_5$ - store $D_4$
$T_6$ - energize Column 3
$T_7$ 1 store $D_3$
$T_8$ - energize Column 4
$T_9$ - store $D_2$
$T_{10}$ - energize Column 5
$T_{11}$ - store $D_1$ The tape buffer register 62 consists of two shift registers, as will be described more fully hereinafter with reference to FIG. 9, each having 120-bit positions for storing six numbers, each having five digits in BCD form. Each number is stored in the same manner as the ID code, starting with the most significant digit, with each successive BCD digit being stored in the first register in the next least significant 4-bit positions.

The first register of the tape buffer register 62 is provided with gates for selectively reading out the five digit numbers, in parallel by BCD bits, and in serial or parallel by BCD digit as needed. It is also provided with gates for recirculating the entire content of its 120-bit positions for writing into one track of magnetic tape 63 in series by BCD digit and BCD bit without any loss of data. The second register is used to store a playback of the recorded sequence of 120-bits for comparison with the content of the first register in order to confirm correct storage of data on the tape. In the event of a detected error, the system will again record on the tape and check the recorded data. Sequence control for that record and check operation occurs at the end of the predetermined program and will be described hereinafter with reference to FIG. 9.

At time $T_{11}$, when the least significant digit of the ID code is stored in the tape buffer, the program counter is disabled via gates 55 and 56 of FIG. 5. The timing signal $T_{11}$ will also energize the ready light 14 (FIG. 1). The meter reader then knows that the transactor has power and is functioning. He also knows it is time to enter the new meter reading, NMR, by punching the proper keys of the keyboard 12. The keys only enter the digits of the NMR into a buffer register 64 via a decimal to BCD converter 65 with the MSD first in the least significant digit (LSD) position. Each subsequent digit entered shift digits already entered to the left using the leading edge of each keyed digit signal to trigger a timing circuit 64a via an OR gate 64b to enable the buffer register to shift in response to five fast clock pulses from the generator 50. In practice, the timing circuit will be comprised of a counter which will meter precisely five shift pulses, i.e., which will count five clock pulses and then reset. In that manner the digits entered in the LSD position are shifted in the direction of the MSD of the buffer register 64 and leading zeroes need not be keyed in.

For simplicity, it is assumed all digits are displayed continuously through a five-digit code converter 66, but in practice the digits may be displayed serially in repeated cycles, thus time sharing a one-digit code converter. Persistence of vision will provide a steady display if the display cycle is repeated every tenth of a second.

Once the meter reader is satisfied he has entered the meter reading properly, he presses the PRINT button to momentarily generate a PRINT signal which sets the flip-flop 58 via the NAND gate 57 in FIG. 5, thereby unlocking the program counter 52. That enables the counter to advance, but at the next count, a signal $T_{12}'$ again disables the program counter. That signal also transfers the content of the buffer register 64 (five BCD digits) into the next five BCD digit positions of the first shift register in the tape buffer. That is instantaneous. In addition, signal $T_{12}$ enters the new meter reading (NMR) into a register (A) in the calculator 68. The program counter is locked at time $T_{12}$ to permit the slow process of printing the NMR out of the tape buffer onto the card.

The card printer 69 to be described with reference to FIGS. 7 and 8 employs non-impact, electroprint heads. Each head is capable of printing five digits in a line, each digit is composed of seven bar segments. For convience, only three 7-bar-segment printing sections are shown and connections are shown complete for only the first, it being understood that other printing sections are similarly connected for each digit position of a printing head. The billing card is sensitized for electroprinting each digit with a coating of ZnO on a conductive (carbon) film.

Figure 7:
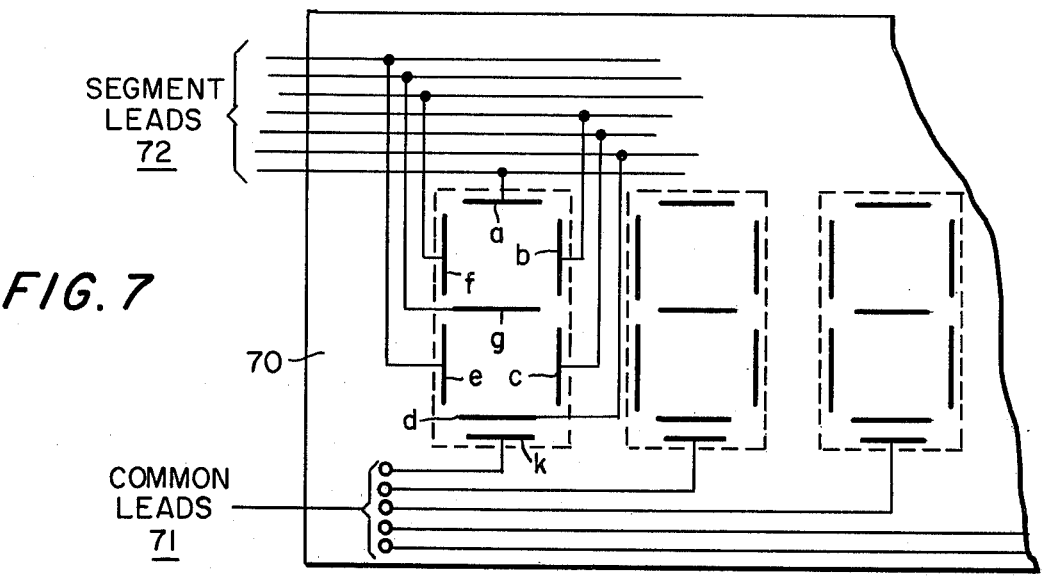
FIG. 7 illustrates schematically an arrangement of printing heads for printing on electrosensitive areas of the card in FIG. 3.

The head illustrated schematically in FIG. 7 consists of a ceramic substrate 70 with seven metallic segments, a through g, for each digit. An eighth "segment" k is provided for making a connection to the common conductive film on the card for the printing of a digit. The common conductive film for each digit is indicated by a dotted line outlining the area of the print head which is in contact with the digit printing area on the card which carries the conductive film. Common leads 71 are employed to select the digit positions for printing in sequence, while segment leads 72 are employed to select the segments *a* through *g* to be sequentially energized for each digit printed. An alternative arrangement would be to have a conductive film common to all digit positions, and separate logic for selectively energizing the 7-bar segments of each individual digit in sequence. In either case, the current through selected segments and the metallic film darkens the ZnO film and thus prints only in the areas covered by the selected segments.

Figure 8:
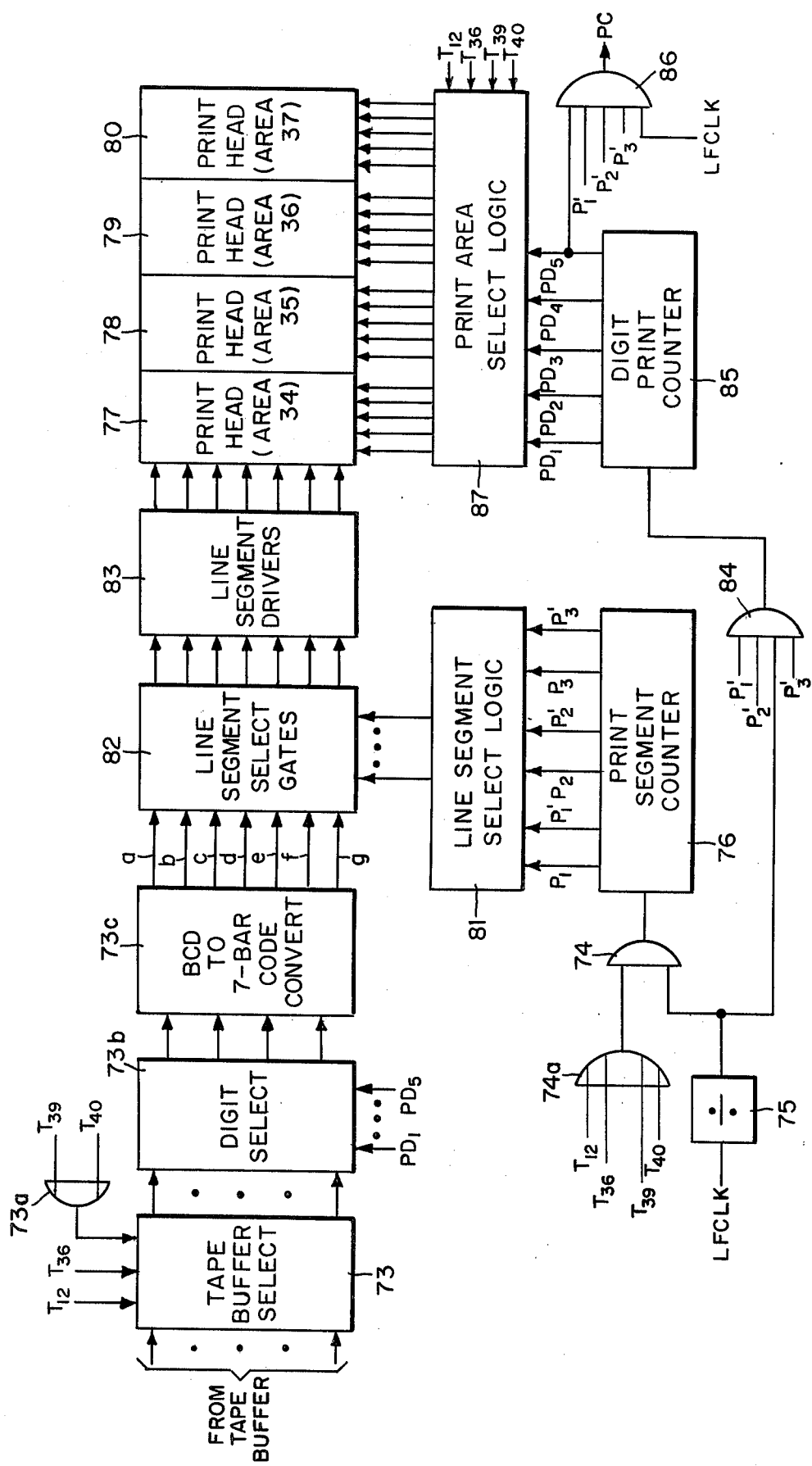
FIG. 8 is a logic diagram of a card printer in the system of FIG. 6.

Referring now to the card printer control logic shown in FIG. 8, a tape buffer select unit 73 in the printer responds to the sequence timing signal $T_{12}$ to select for printing the five BCD digit positions (20-bit positions) of the tape buffer into which the new meter reading (NMR) is entered. The sequence timing signal $T_{12}$ also enables AND gate 74 via an OR gate 74*a* to transmit low frequency clock pulses from a frequency divider 75 to a print segment counter 76. The frequency divider 75 reduces the low frequency clock, LFCLK, to a sufficiently low frequency, such as 25 Hz, to permit printing through a selected electroprint head from a group of heads 77, 78, 79 and 80 for the respective areas 34, 35, 36 and 37 shown on a card in FIG. 3.

The print segment counter 76 is a 3-bit binary counter, the output of which is decoded by line segment select decoder 81 to sequentially gate through a bank of AND gates 82 line segment signals to segment leads of the print heads via line segment drivers 83. The line segment select decoder is simply a logic network for converting the binary output of the counter 76 into a decimal code where only one of seven lines is energized for each of the binary counts from 001 through 111.

After the last segment *g* of the first digit has been selected for printing, if necessary, and the counter 76 cycles to the zero state, an AND gate 84 is enabled to transmit a clock pulse from the frequency divider 75 to a digit print counter 85 implemented as a ring counter having five stages, the first of which is on when the counter is in the reset state in order that a signal $PD_1$ be transmitted to select the first of five digits to be printed through the first one of five common leads 71 (FIG. 7). In that manner, the first digit is printed before the AND gate 84 transmits a clock pulse to advance the digit print counter to its second state during which a signal $PD_2$ is transmitted to select the second digit. The sequence is repeated until all five digits have been printed.

A digit select network 73*b* responds to the signals $PD_1$ through $PD_5$ to sequentially gate the BCD digits to a BCD to 7-bar code converter 73*c*. In that manner the tape buffer select unit 73 couples a selected group of 5 BCD digits to the digit select network which transmits the four bits of a selected digit to the code converter for printing.

Figure 6:
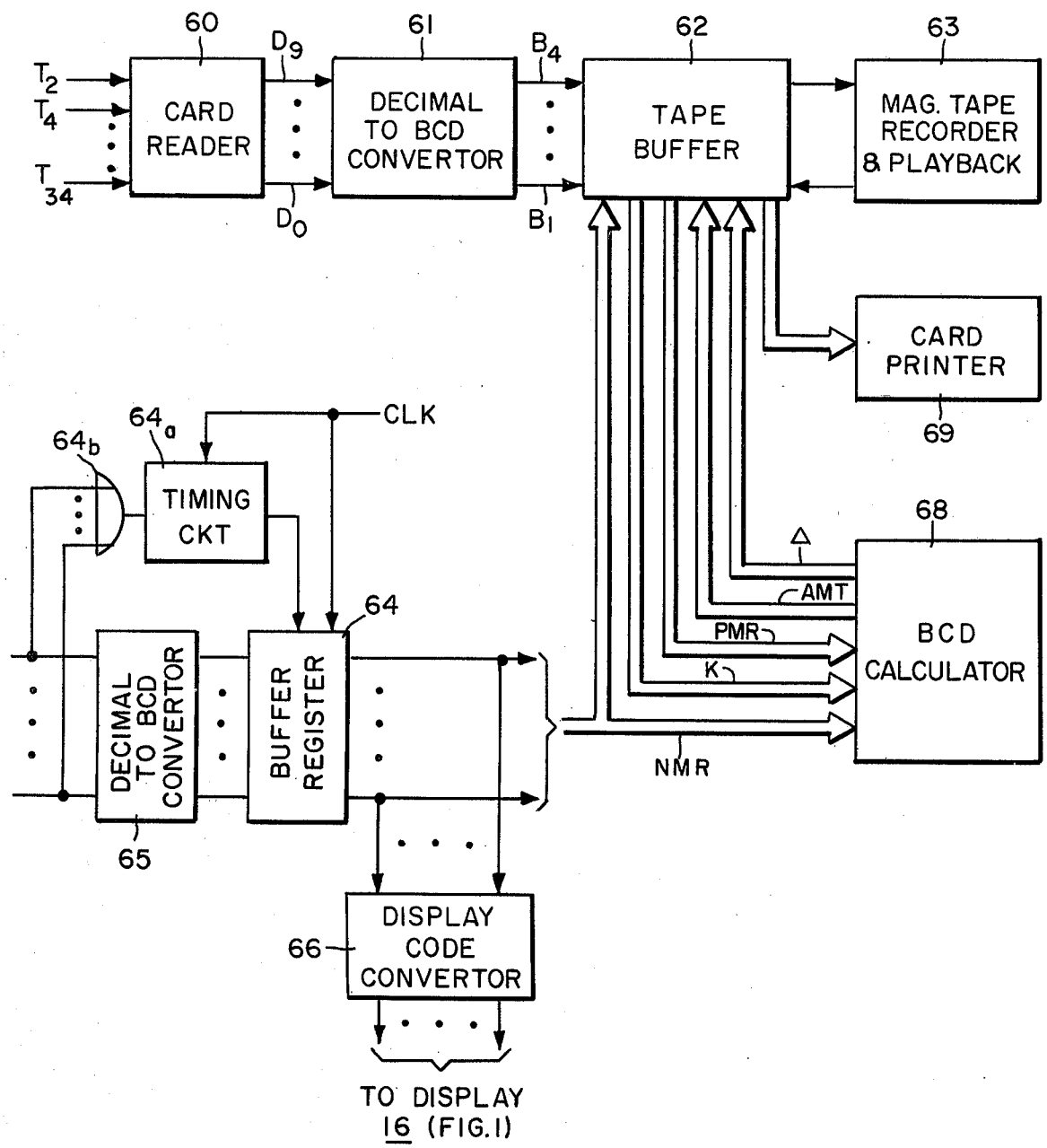
FIG. 6 is a block diagram showing a preferred arrangement for the electronic system of the exemplary embodiment.

After the fifth digit has been printed and the print segment counter 76 overflows, i.e., returns to the zero state, the next low frequency clock is transmitted through an AND gate 85 as a print complete signal, PC, to the NAND gate 57 in FIG. 6 to unlock the program counter.

Figure 3:
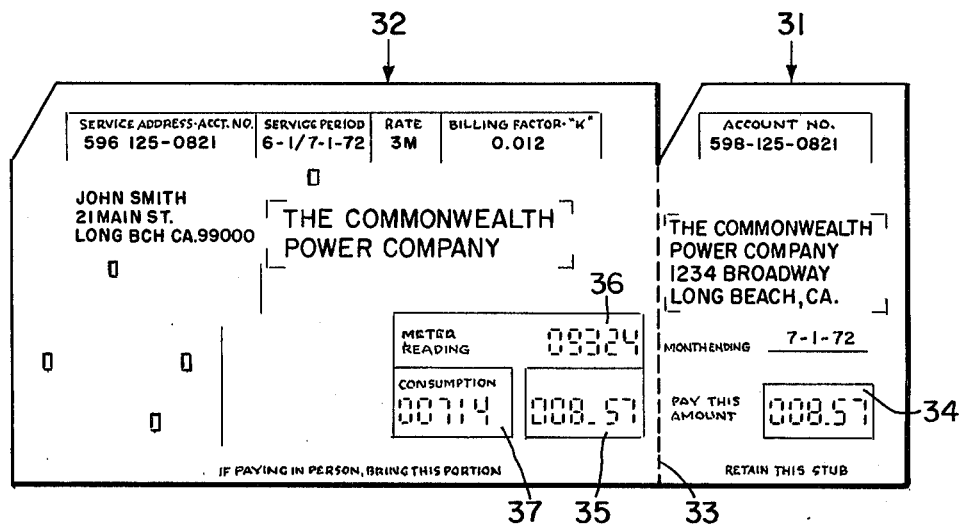
FIG. 3 shows a billing card adapted for use in the exemplary embodiment.

The output terminals $PD_1$ through $PD_5$ of the print digit counter 85 are connected to a print area select logic network 87 which permits the print digit counter to energize in sequence the common leads 71 (FIG. 7) of the print head for the area 36 (FIG. 3) in response to the timing signal $T_{12}$. At time $T_{36}$, when the consumption ($\Delta$=NMR-PMR) is to be printed, the signals $PD_1$ through $PD_5$ are effective to select for printing digits through the print head for the area 37 (FIG. 3). That is accomplished through one bank of AND gates enabled by the signal $T_{36}$ to transmit the signals $PD_1$ through $PD_5$ to successive ones of the common lines 71 (FIG. 7) for the head of the area 37. Timing signals $T_{39}$ and $T_{40}$ are similarly effective in causing the amount to be paid in areas 34 and 35.

Once printing of the new meter reading is complete and the program counter 52 advances to the count of $T_{13}$ at the output of the decoder 54, a sequence is initiated for reading from the card the previous meter reading, PMR. The sequence is carried out during the timing periods $T_{13}$ through $T_{22}$ where the odd timing periods are used to sequentially illuminate columns 6–10 of the card and the even timing periods $T_{14}$ through $T_{22}$ are used to store the decimal digits read and converted to a BCD code into the five BCD digit positions (20-bit positions) of the first register in the tape buffer.

The PMR read from columns 6–10 of the card is not printed on the billing card by the transactor. If the PMR is to be printed in that portion to be retained by the customer for the customer's information, it may be printed on the card at the time that it is punched into columns 6–10. Consequently, during the next sequence timing period $T_{23}$ the calculator 68 enters the PMR in a register (Q) in parallel. This is possible by having the appropriate 20-bit positions of the tape buffer connected to input terminals of a designated register in the calculator for parallel entry in response to the timing signal $T_{23}$.

The next timing signal $T_{24}$ commands the calculator to subtract the PMR in the Q-register of the calculator, from the new meter reading, NMR, in the A-register of the calculator, and to store the difference, $\Delta$, in the A-register. The next timing signal $T_{25}$ causes the difference, $\Delta$, to be copied in parallel into the next five BCD digit positions (20-bit positions) of the first register in the tape buffer, without destroying the difference in the A-register in order that it may be multiplied by the billing factor. That is accomplished by simply copying the content of the A-register at that time directly into predetermined positions of the tape buffer register through prewired gates.

The next timing signal $T_{26}$ initiates reading out the billing factor from the card into the tape buffer. That is accomplished during the successive timing periods $T_{26}$–$T_{35}$. During successive even periods columns 11–15 of the billing card are sequentially illuminated and during the odd timing periods, the successive BCD digits are entered into successive BCD digit positions (4-bit positions) of the first register in the tape buffer. The next timing signal $T_{36}$ disables the program counter via the gates 55 and 56 and causes the billing factor, K, to be transferred in parallel from the appropriate bit positions of the first register in the tape buffer to a third Q-register of the calculator.

The timing signal $T_{36}$ is also applied to the tape buffer select unit 73 and print area select unit 86 to print the difference, $\Delta$, in the area 37 of the billing card before the amount to be paid is computed. That is accomplished in the same manner in which the new meter reading was printed in the area 36 of the billing card.

The action is started by the print segment counter 76 in response to the timing signal $T_{36}$ applied to the AND gate 74 via OR gate 74a. When printing is complete, a signal PC unlocks the program counter via the NAND gate 57 as before.

It should be noted that for simplicity, it is assumed that all five digits are printed, including the leading zeroes, but in practice, additional logic may be provided for suppressing the leading zeroes and initiating the actual printing process with the most significant non-zero digit. During this period of suppressing leading zeroes, the timing sequence of the printer could be accelerated to save time, but the time to be saved would not normally justify the additional complexity of the control logic. However, it would still be advantageous to suppress the actual printing of leading zeroes in order to save the power that would be wasted in printing such leading zeroes.

It should also be noted that the time in the programmed sequence during which the difference is printed is not important. It could just as easily have been printed before reading out the billing factor, K, or deferred until after the amount to be paid is computed and then printed, either before or after the amount to be paid is printed.

The next timing signal $T_{37}$ initiates a multiply command in the calculator to cause the difference in the A-register to be multiplied by the rate factor in the Q-register through successive parallel additions of the difference a number of times as designated by the billing factor, and storing the partial products. To assure sufficient time for this multiplication, the timing signal $T_{37}$ disables the program counter. When the multiplication is complete, the calculator generates a multiplication complete signal, MCP, to unlock the program counter through the NAND gate 57.

There are many known ways of implementing the multiplication process. For simplicity, it is here contemplated that a third register, which may be referred to as the M-register, is provided in the calculator and implemented as a counter which counts down one for each addition step of the multiplication. The first step in the multiplication process is to transfer the consumption, $\Delta$, into the M-register at time $T_{36}$. The M-register causes the content of the Q-register to be added to the content of the A-register one time each time it counts down one, thus building up the product in the A-register. An advantage of this technique is that in the case of multiple billing factors to be applied according to a rate schedule, such as one billing factor for the first 40 KWH, another for the next KWH, etc., it would be simple to stop the multiplication at the proper time and fetch another billing rate.

The next timing signal $T_{38}$ initiates a parallel transfer the product of the multiplication, i.e., the amount to be paid, AMT, from the A-register to the next five digit positions of the first register in the tape buffer. The transfer is in parallel through prewired gates enabled by the timing signal $T_{38}$.

The next timing signal $T_{39}$ disables the program counter and initiates printing on the billing card the amount to be paid from the tape buffer. Because of the amount of power required to print each segment of a digit on the billing card, and the limited power provided by the batteries in this portable transactor, the amount to be paid is first printed in the area 35 of the billing code. The signal $T_{39}$ selects the five digit print head for the area 35 while the signal $T_{39}$ directs the tape buffer select unit 73 through an OR gate 73a to print the amount to be paid in the same manner as the new meter reading, NMR, printed in the area 36 and the difference, $\Delta$, printed in the area 37 labled "consumption".

After the print sequence is complete, a signal PC generated by the print control unit unlocks the program counter which then advances to the next count $T_{40}$ and again locks for another printing cycle, this time to print the amount to be paid in the area 34 through the print head for the area 34 selected by the signal $T_{40}$ while the amount to be paid is again selected by the tape buffer select unit 73 (FIG. 8) as directed by the signal $T_{40}$ through the OR gate 73a.

Each time the amount to be paid is printed the printing sequence is commenced when the print segment counter 76 is enabled to receive clock pulses through the AND gate 74 by the timing signals $T_{39}$ and $T_{40}$ via the OR gate 74a. Although not shown, it is understood that the print segment counter and print digit counter are reset by the print complete signal even though those counters have by design recycled to their reset state in order to assure that the next printing sequence does start with those counters in their reset state.

When the amount to be paid has been printed the second time, the print complete signal, PC, unlocks the program counter, and the next timing signal, $T_{41}$, relocks the timing counter via the NAND gates 55 and 56. The signal $T_{41}$ also initiates transfer of the data stored in the first register of the tape buffer into the magnetic tape.

From the foregoing it is evident that in this first embodiment, a fixed program is provided by the program counter. The same organization can be used in other embodiments where the sequence of operations is controlled by stored operation codes read from the billing card, or read from a random access memory as in a conventional programmed digital computer.

The organization of the calculator will now be described with reference to FIG. 9. It is essentially the organization of a conventional arithmetic unit in a programmed digital computer. It contains an A-register 90 used as an accumulator during all arithmetic operations, a Q-register 91, an M-register 92 and a parallel adder/subtracter unit 93. When the previous meter reading in the Q-register is subtracted from the new meter reading at time $T_{24}$, subtraction logic is enabled in the unit 93. The difference, $\Delta$, is stored in the A-register. At time $T_{36}$, when the billing factor K is entered into the Q-register, the content ($\Delta$) of the A-register is transferred to the M-register 94 for use as a multiplier during multiplication. The product is developed in the A-register.

In the case of electricity, a typical rate factor may be 5.525 cents per kilowatt hour. Therefore, the multiplication called for would be, for example, 175KWH × 0.05525. The multiplication carried out during time $T_{37}$ is initiated by setting a JK flip-flop 95 to repeatedly add the contents of the A and Q-registers, and to store the sum of each addition in the A-register. Each addition occurs in response to a low frequency clock, LFCLK, which is counted down in the M-register through a gate 96. When the M-register has counted down to one, a decoder 97 detects this condition and enables the next clock, LFCLK, to reset the flip-flop 95. The product is then in the A-register. A gate 98 also transmits a clock pulse as a multiplication complete signal, MCP, to the NAND gate 57 (FIG. 2).

The A-register and addition logic is sufficiently long to accomodate the largest product anticipated without overflow. Should an overflow (array) from the MSB position of the addition logic, a flip-flop 99 will be set by the MSB carry signal to energize an overflow lamp OVF until the transactor is cleared and the flip-flop 99 is reset. Parallel addition is contemplated in this exemplary embodiment for simplicity. However, in practice it may be desirable to perform addition and subtraction in series by BCD digit and in parallel by binary digits of each decimal digit. The fast clock, CLK, could be used to sequence the successive steps of each serial addition or subtraction.

The product formed in the A-register is with a fixed decimal point. In this exemplary embodiment, the decimal point would be five BCD places from the right. Upon printing out the product as the amount to be paid, only two decimal places to the right of the decimal point are printed. The balance, which is a fraction of one cent, is ignored. If desired, logic could be included to round off at the time of printing.

Figure 10:
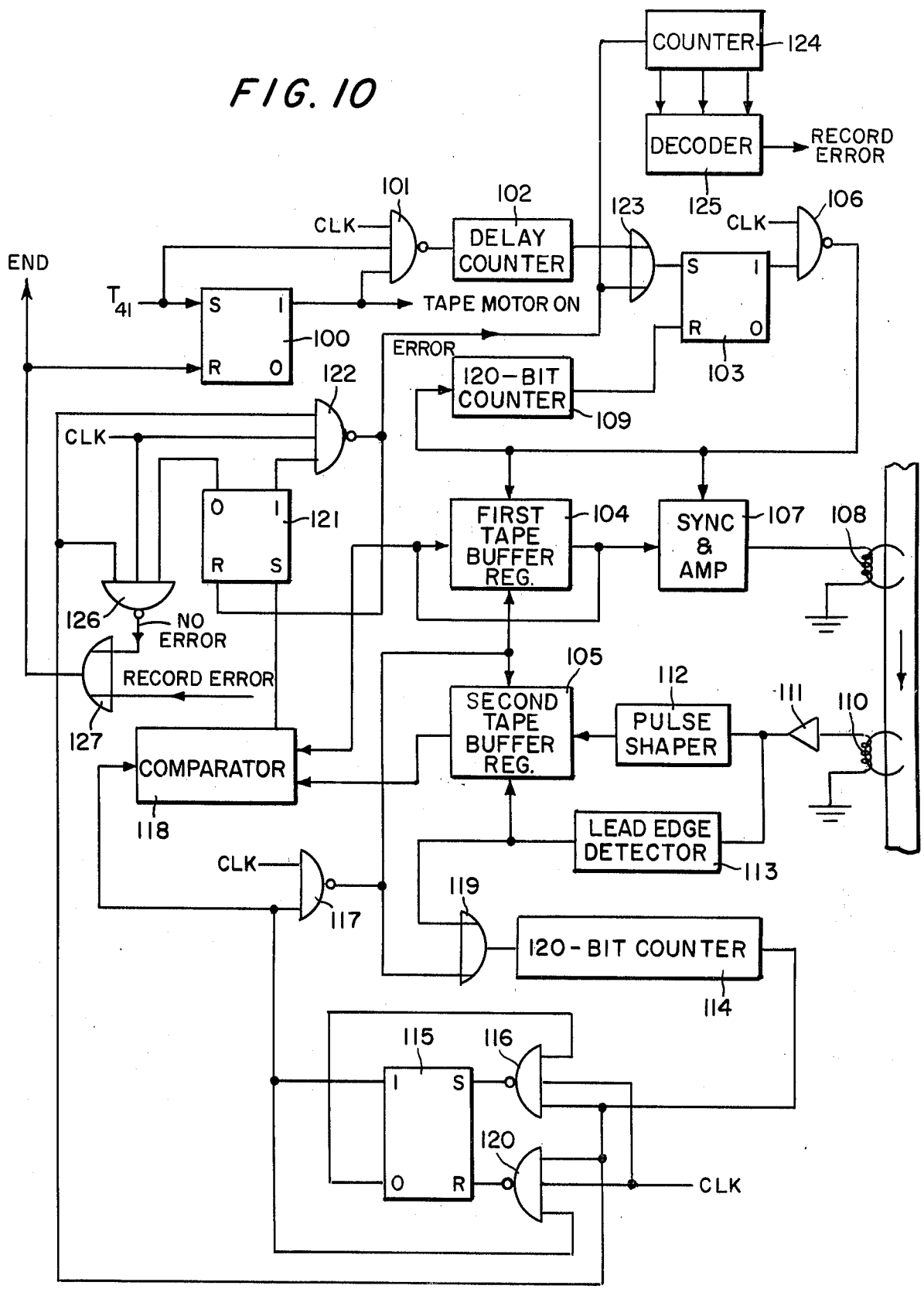
FIG. 10 is a logic diagram of a magnetic tape recorder in the system of FIG. 6.

FIG. 10 illustrates the control logic for recording on tape. The timing signal $T_{41}$ sets a flip-flop 100 to turn the tape motor on, and enables a NAND gate 101 to transmit clock pulses, CLK, to a delay counter 102. The purpose of that counter is to delay transfer of data to the tape until the tape is up to speed. At the end of the delay period, a flip-flop 103 is set to start recording on tape the content of the first register in the tape buffer unit. The first and second registers in the tape buffer unit are shown as two 120-bit registers 104 and 105.

The flip-flop 103 enables a NAND gate 106 to transmit system clock pulses, CLK, to the shift register 104 and to a synchronizing and amplifying unit 107 for storing each binary digit shifted out of the first tape buffer register on tape. The data is preferably shifted out in the order stored in the register with the most significant bit of the MSD of the meter ID first.

A bit zero is stored on the tape as a short pulse less than half the period of a clock pulse (about one-fourth), and a bit one is stored as a longer pulse more than half the period of a clock pulse (about three-fourths) through a write head 108. A counter 107 counts the clock pulses applied to the register 104. When 120 clock pulses have been counted, the counter 109 resets the flip-flop 103 to complete recording one time.

A read head 110 positioned downstream from the write head senses the pulses recorded through the head 108. An amplifier 111 and pulse shaper 112 restores the pulses read to substantially the shape of pulses at the output of the amplifier 107. A detector 113 detects the leading edge of each recorded bit from the amplifier 111 to produce a sharp self-synchronizing pulse and delays it half the period of the clock pulses in order to effectively strobe the output of the amplifier 111 at the center of each bit period. To accomplish that, the delayed pulse is applied to the shift register. If a short pulse is present at the output of the amplifier, indicating a bit 0 read, the pulse from the detector 113 shifts a bit 0 into the register 105. If a long pulse is present at the output of the amplifier, indicating a bit 1 read, the pulse from the detector 113 shifts a bit 1 into the register 105.

Other self-synchronizing record and playback systems may be used, such as simply recording the clock pulses in second channel in parallel with binary digits being recorded, using side-by-side write heads. The clock pulses may then be read in a second read head beside the read head 110. However, this or an equivalent self-synchronizing record and playback system is preferred to avoid doubling the number of read heads and having to maintain precise spacing between heads of each pair.

A second 120-bit counter 114 counts the self-synchronizing clock pulses out of the detector 113 to determine when playback of the recorded data is complete. When complete, a flip-flop 115 is set via a NAND gate 116 to enable a NAND gate 117 to transmit system clock pulses to both shift registers 104 and 105, thereby shifting both through a comparator 118. When 120-bits have been shifted through the comparator by clock pulses counted by the counter 114 via an OR gate 119, the flip-flop 115 is reset via a NAND gate 120. The comparator is also enabled by the flip-flop 115.

The comparator is comprised of an exclusive OR gate which indicates an error if its output is ever true while the paired bits are being shifted through it from the two registers. If so, a flip-flop 121 is set. At the end of the 120-bit compare period determined by the counter 114, and while the flip-flop 115 is being reset, the flip-flop 103 is set, via a NAND gate 122 and an OR gate 123, to initiate another recording and playback cycle. At the same time the flip-flop 121 is reset and a counter 124 is incremented to a count of one. If an error occurs again during the second or third time, the counter 124 is incremented each time. If incremented to a count of three, a decoder 125 detects the count and signals RECORD ERROR to turn on the "record error" lamp 19 (FIG. 1). The meter reader may manually clear the error signal by pushing the clear button, but that is not necessary because the transactor clears itself automatically at time $T_1$ of a new sequence for the next billing card. After pulling out the billing card just processed with an error in recording, he manually fills out a duplicate billing card to return to the central office for checking at the central office, and proceeds to deliver the billing card just pulled out.

If no error occurs during the first, second or third recording cycle, NAND gate 126 signals NO ERROR. That signal, or the ERROR signal, unlocks the program counter via OR gate 127 (FIG.9) and NAND gate 55 (FIG. 5). The next timing signal $T_{42}$ then turns on the complete lamp 18 (FIG. 1). Upon removing the billing card, the complete lamp is turned off as all power is removed from the billing transactor.

In the foregoing description of a first exemplary embodiment, a constant billing factor was assumed for all of the consumption of a customer. That is often not the case, as will now be described for a second embodiment of the invention with reference to FIG. 11. Instead, a typical monthly bill for electricity may be computed in accordance with the following charges:

| First 40 KWH | at 5.525 cents per KWH |
| Next 40 KWH | at 4.025 cents per KWH |
| Next 140 KWH | at 2.525 cents per KWH |
| Next 768 KWH | at 2.025 cents per KWH |
| Additional KWH | at 1.025 cents per KWH |

To accommodate such a rate structure, which may be different for different classes of customers, the rate factor, K, is not entered into the Q-register of the calculator for computing the bill. Instead, the number K is used as a code to address a readonly memory (ROM)

130 where the applicable rate schedule is stored. Consequently, at time $T_{36}$, the number K is stored in an X-register 131.

Figure 11:
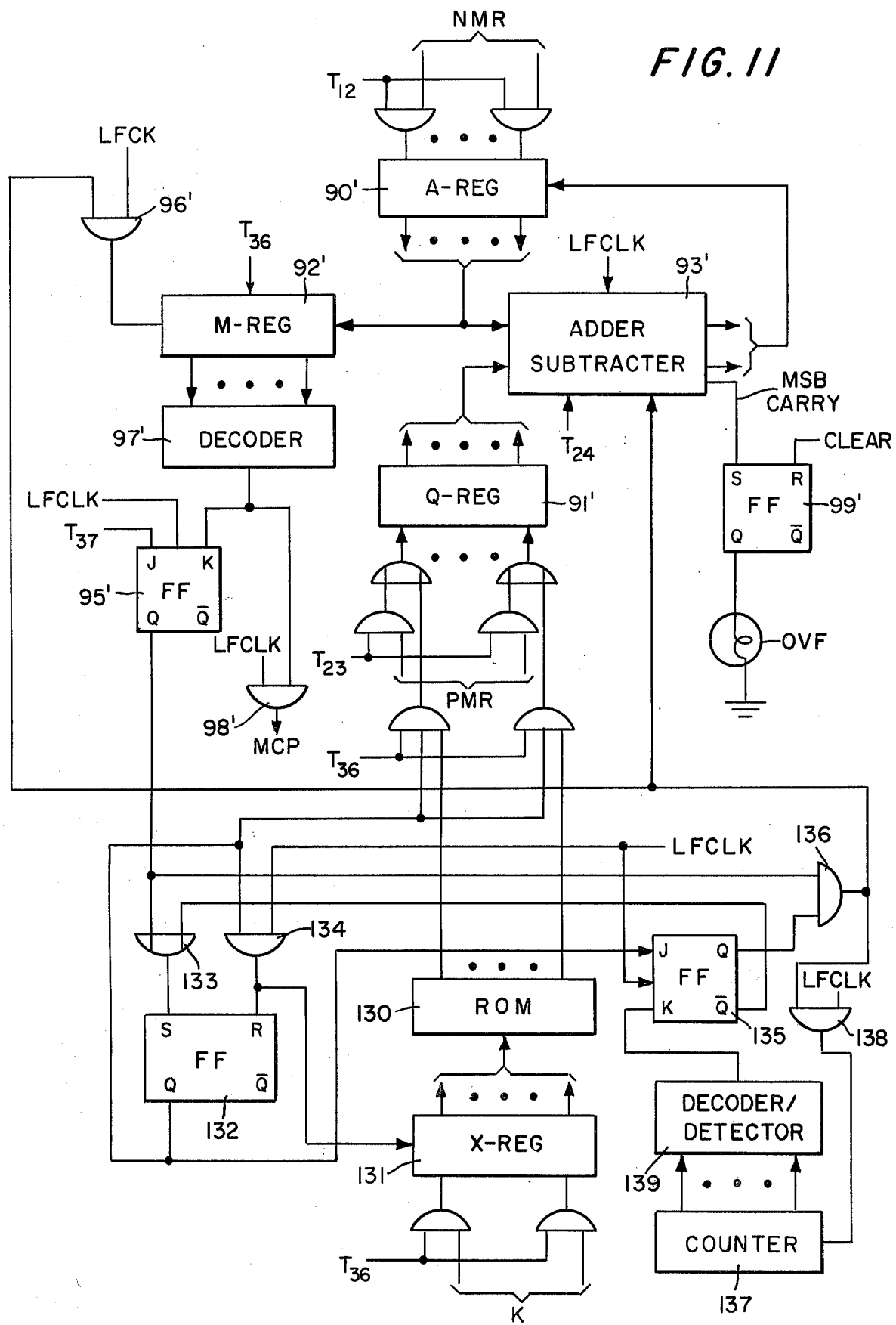
FIG. 11 is a logic diagram of an alternative calculator in the system of FIG. 6.

In the modified calculator shown in FIG. 11, the components common to the first embodiment are identified by the same reference numeral, but distinguished by a prime for each reference numeral.

The number in the X-register points to a block of successive memory locations which contain the rates to be applied to successive increments of consumed electrical power. Consequently, when the timing signal $T_{37}$ sets the flip-flop 95' to initiate multiplication, a flip-flop 132 is set via an OR gate 133 to enable the rate to be read out from the location in the ROM specified by the X-register in response to the next low frequency clock which also resets the flip-flop 132 via an AND gate 134 and increments the X-register to the address of the next rate. That same clock pulse, LFCLK, sets a JK flip-flop 135 to enable an AND gate 136, and thereby enable the adder-subtracter to respond to subsequent low frequency clock pulses, LFCLK, for multiplication by successive addition of the first rate factor from the ROM to the content of the A-register, which is forty times for the first 40 kilowatt hours, unless the M-register 94' which counts the number of additions has counted down to one, in which case the decoder 96' causes the flip-flop 95' to be reset with the next clock, LFCLK, to stop the multiplication after the next addition.

Assuming the M-register has not counted down to one, multiplication by addition continues with a new rate for the next 40 kilowatt hours. A counter 137 counts up the number of additions by counting the low frequency clock pulses, LFCLK, via a gate 138. When the number 39 stored with the rate of 5.524 cents per KWH and read from the ROM is detected by a decoder/detector 139, the flip-flop 135 is reset by the next LFCLK pulse. The 40th addition is thus initiated. The leading edge of the $\overline{Q}$ output of the flip-flop 135 sets the flip-flop 132 via OR gate 133 to permit the next LFCLK pulse to: reset the flip-flop 132; enter a new rate from the ROM; set the JK flip-flop 135 to allow multiplication to be resumed with the following LFCLK pulse; and increment the X-register 131 to the address of the next rate. Multiplication then continues as before until the decoder 96' stops it after all kilowatt hours have been multiplied by a rate factor, or until the decoder/detector 139 stops it momentarily when the 79th kilowat hours is being multiplied in order to read out the next rate together with the number 221 to be used in the decoder/detector 139. When the last rate has been read out, the multiplication process continues until the M-register counts down to one. To assure that, a negative one is stored with the last rate and read out to the decoder/detector which obviously fails to detect a negative one as the counter 137 counts up. The next LFCLK pulse initiates the last cycle of adding the last rate factor in the Q-register to the accumulated total in the A-register and resets the flip-flop 95'. At the same time, the gate 98' transmits a multiplication complete signal, MCP, to the sequence control section to advance the program counter to $T_{38}$.

These embodiments may be modified to accommodate additional factors which make up the monthly bill by interjecting additional sequenced operations. For example, if there is to be a minimum of $1.00, the net bill just computed may be compaared at time $T_{38}$, with the minimum, and the larger amount selected as the amount to be paid. That would require only one LFCLK period, and would therefore merely shift all the remaining operations over one timing period of the program counter. Still other operations can be added, such as reading a previous balance from the card and adding it to the current monthly bill. The sum would then be printed as the amount to be paid. However, as additional factors are included, the complexity of the system hardware increases. It then becomes advantageous to implement as much of the hardware as possible with software. That can be done, for example, by including solid-state random access memory (RAM) for storing both instructions and data for a sequence of operations tailored to each customer using standard subroutines stored and called as necessary, such as the billing rate schedule for the customer, minimum billing, previous balance, and so forth. The customer's ID would simply be used to call out the applicable block of instructions and data.

Because modifications and variations falling within the spirit of the invention will occur to those skilled in the art, it is not intended that the scope of the invention be determined by the disclosed exemplary embodiments, but rather should be determined by the breadth of the appended claims.

What is claimed is:

1. In a portable billing transactor for entering and processing a utility service transaction, and printing a bill on a record medium for immediate delivery to a customer, said service being measured by a meter read by a person for manual entry, said medium having information necessary for computing the bill in predetermined areas, said information including the previous meter reading and a rate code, the combination comprising:

means for accepting said record medium and holding it in a static postion during a billing transaction;

calculating means for performing arithmetic calculations on data coupled thereto under electronic control, said calculating means including first and second arithmetic registers;

means for reading data from different predetermined areas of said record medium at different controlled times;

means for printing data on different predetermined areas of said record medium at different controlled times;

a buffer register for storing said new meter reading;

keyboard means for manually entering said new meter reading into said buffer register for display;

keyboard means for manually producing a print command;

means responsive to said print command for coupling said net meter reading as displayed from said buffer register into said calculating means;

a source of clock pulses;

a ready light and means for displaying said new meter reading entered into said buffer register;

sequence control means including a program counter responsive to said source of clock pulses for automatically controlling said calculating means, reading means and printing means through predetermined coordinated operations once said accepting means has received a record medium in said static position, said coordinated operations comprising:

energizing said ready light to call for manual keyboard entry of said new meter reading into said buffer register after said holding means has accepted said record medium and said record medium is being held in a static position;

energizing said display means to call for a manual keyboard production of said print command to cause said new meter reading to be printed on said record medium and to be coupled into said first one of said arithmetic registers;

reading said previous meter reading from a second predetermined area of said record medium into said second one of said arithmetic registers when printing of said new meter reading has been completed;

computing a difference between said new meter reading and said previous meter reading, and for storing the difference in said first one of said arithmetic registers;

printing said difference in a preselected area of said record medium;

reading said rate code into said calculating means;

computing the amount due from said difference and said rate code;

printing said amount due in a preselected area of said record medium.

2. Apparatus as defined in claim 1 including addressable means in said calculating means for storing a plurality of rate schedules, each rate schedule consisting of a plurality of rate factors accessed in sequence upon addressing said addressable means by a unique code, and wherein said rate code read from said record medium constitutes said unique code, and further including means for multiplying successive predetermined increments of said difference by successive ones of said rate factors in calculating said amount due.

3. Apparatus as defined in claim 1 wherein said information prerecorded in predetermined areas includes a customers identification number and said sequence control means includes coordinated control of the operation of reading said customer identification number from a predetermined area, and said apparatus including nonvolatile bulk storage means for recording transaction information including said customer's identification number, previous meter reading new meter reading, difference between said new meter reading and said previous meter reading, and the amount due.

4. Apparatus as defined in claim 3 wherein said nonvolatile bulk storage means includes a buffer storage means for temporary storage of said transaction information as it is read from said record medium and as it is computed, and a magnetic tape into which the contents of said buffer storage means is transferred as the last of said coordinated operations under control of said sequence control means.

5. Apparatus as defined in claim 3 including addressable means in said calculating means for storing a plurality of rate schedules, each rate schedule consisting of a plurality of rate factors accessed in sequence upon addressing said addressable means by a unique code, and wherein said rate code read from said record medium constitutes said unique code, and further including means for multiplying successive predetermined increments of said difference by successive ones of said rate factors in calculating said amount due.

* * * * *